2,879,132
TITANIUM TETRACHLORIDE PURIFICATION

Winfred J. Cauwenberg, Plainfield, N.J., and Albert Dietz, Lynchburg, Va., assignors to American Cyanamid Company, New York, N.Y., a corporation of Maine No Drawing. Application April 23, 1957
Serial No. 654,449

4 Claims. (Cl. 23—87)

The present invention relates to the purification of titanium tetrachloride. More particularly, the invention relates to the purification of liquid titanium tetrachloride containing a volatile vanadium impurity dissolved therein.

Titanium tetrachloride is generally produced by chlorinating an oxidic ferrotitaniferous material such as ilmenite, rutile, or ferrotitaniferous slags under reducing conditions, selectively condensing an iron chloride-titanium tetrachloride fraction from the gaseous mixture of metal chlorides which results, and distilling the mixture to form a titanium tetrachloride vapor. This vapor is usually better than 95% pure and may be condensed to form the crude liquid titanium tetrachloride of commerce.

The ferrotitaniferous ores and slags referred to above generally contain oxidic vanadium material which is converted to volatile form during chlorination along with the titanium values, so that the crude titanium tetrachloride produced as aforesaid normally has a dissolved content of vanadium as impurity. It is not uncommon for crude titanium tetrachloride prepared in this manner to contain 0.1%–1% by weight of vanadium calculated as $V_2O_5$.

A principal use of titanium tetrachloride is as a raw material for the manufacture of titanium dioxide pigment. Titanium dioxide is white, and the presence of vanadium in such material is undesirable as it leads to the formation of off-color pigment.

The composition of the vanadium impurity has not been ascertained, but theory indicates that the vanadium is in the form of one or more vanadium chlorides or oxychlorides which are soluble in liquid titanium tetrachloride. The boiling point of at least one of these impurities (vanadium oxychloride, $VOCl_3$) is very close (127° C.) to the boiling point of titanium tetrachloride (136° C.) which explains why these impurities tend to accompany titanium tetrachloride throughout normal purification based on distillation.

The discovery has now been made that liquid titanium tetrachloride having a volatile vanadium impurity dissolved therein can be purified by a process which comprises heating the titanium tetrachloride with a dithiophosphate ester, after which a purified titanium tetrachloride can be recovered by filtration or distillation. Apparently the dithiophosphate ester reacts with the vanadium impurity converting it to insoluble and non-volatile form. In numerous instances we have been successful by this means in decreasing the vanadium content of the titanium tetrachloride from about 1% by weight calculated as $V_2O_5$ to less than 50 parts per million.

The purification treatment, according to a preferred embodiment of the invention, involves as its principal feature, mixing the crude titanium tetrachloride with a dithiophosphate ester and heating, the titanium tetrachloride being maintained in the liquid phase. At least part of the vanadium impurities are thereby converted to insoluble and non-volatile form. The purifying agent reacts with the vanadium and other similar impurities forming a sludge, after which purified titanium tetrachloride can be recovered by filtration or distillation.

The temperature at which the titanium tetrachloride is maintained during treatment is not at all critical, and it is frequently most convenient to reflux the material at atmospheric pressure. The reflux action provides sufficient agitation to maintain the purifying agent in uniformly distributed condition and the reaction proceeds rapidly, no more than 120 minutes having been required. If desired, lower temperatures may be employed and there is evidence that the reaction proceeds slowly but at a quite useful rate at room temperature and particularly above 40° C., when sufficient agitation is provided to maintain dispersion of the purifying agent throughout the liquid.

In certain instances the dithiophosphate esters tend to decompose at the atmospheric reflux temperature of titanium tetrachloride forming amber material which distills with the titanium tetrachloride. We have found that this decomposition can be decreased to a negligible value without unduly prolonging the reaction by maintaining the temperature of the titanium tetrachloride during treatment at an effective reaction temperature below about 90° C. and if the titanium tetrachloride is distilled, performing the distillation under reduced pressure at a temperature below about 90° C. For convenience it is preferred to perform both the reaction and the distillation at a temperature between 40° C. and 90° C.

The dithiophosphate esters differ somewhat in the speed with which they react, and suitable time-temperature relationships can be easily determined for each dithiophosphate by laboratory trial as shown in the examples below. The presence of a trace of straw-or amber-colored dithiophosphate decomposition products in the purified titanium tetrachloride does not effect the color of titanium dioxide pigment produced therefrom.

The invention does not depend upon the addition of any particular amount of dithiophosphate ester, and sufficient should be added to produce the amount of purification desired. As a rule of thumb, it may be initially assumed that our preferred agents are capable of converting volatile vanadium impurities to non-volatile form on roughly a weight-for-weight basis.

The dithiophosphate esters are a known class of compounds prepared by reacting phosphorus pentasulfide with an alcohol or mixture of alcohols. Diesters form which may be converted to triester form by reaction with an alkyl or other suitable halide or into monoester form by partial hydrolysis. The esters are named as derivatives of dithiophosphoric acid,

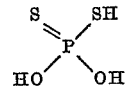

The mono-, di- and triesters may be used for purposes of the present invention but we prefer the monoesters and the diesters either in free acid form or in the form of their salts as these esters appear to react somewhat faster with the vanadium impurities than the triesters.

Our evidence is that the purifying action of the dithiophosphate esters is chiefly due to the dithiophosphate

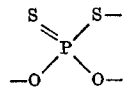

grouping therein, and does not depend upon the particular ester group or groups present. The evidence is thus that dithiophosphoric acid itself is effective. We may use the higher alkyl dithiophosphates such as the dodecyl dithiophosphates, cyclic dithiophosphates such as the cyclohexyl and phenyl dithiophosphates, or unsaturated dithiophosphates such as the oleyl or allyl dithiophosphates. Our results indicate that more fluid and more easily pumpable still foots are generally formed in shorter reaction time when the titanium tetrachloride is treated with a lower aliphatic and particularly a lower alkyl dithiophosphate, and we thus prefer the lower dialkyl dithiophosphates wherein the alkyl groups contain no more than six carbon atoms.

The invention will be further described by the examples which follow. These examples represent specific embodiments of the invention and are not to be construed as limitations thereon. Parts are by weight unless otherwise stated.

*Examples 1–10*

The following illustrates the substantially complete purification of titanium tetrachloride according to the invention, the titanium tetrachloride being separated from the sludge by distillation.

The titanium tetrachloride used was the crude product prepared by chlorinating ilmenite ore concentrate under reducing conditions to form a gaseous mixture containing the iron and titanium values in the ore, selectively condensing titanium tetrachloride after selective condensation of iron chlorides thereby forming a liquid condensate mixture predominantly composed of titanium tetrachloride but containing a substantial amount of iron chlorides, distilling the condensate to separate titanium tetrachloride therefrom, and condensing the titanium tetrachloride thus distilled. The crude titanium tetrachloride thus produced was found by analysis to contain 9,980 parts per million of vanadium impurities calculated as $V_2O_5$.

The effectiveness of dithiophosphate esters as purifying agents was shown by uniformly mixing 200 gm. of the above-described crude titanium tetrachloride at room temperature with the amount of dithiophosphate ester shown in the table below, heating the mixture in a distillation flask equipped with thermometer, stirrer, and air-cooled condenser for the time and at the temperature shown in the table, and distilling at atmospheric pressure, after which the distillate was analyzed for vanadium. In each instance the distillate was amber in color. Results are as follows.

| Ex. | Dithiophosphate Added | | Heating | | $V_2O_5$ Content, p.p.m. |
|---|---|---|---|---|---|
| | Name | Amt.[1], Percent | Temp., °C. | Time, Min. | |
| Blank | None | | 136 | 30 | 9,980 |
| 1 | Diethyl [2] | 2 | 136 | 30 | <50 |
| 2 | ---do [2] | 1 | 136 | 120 | <50 |
| 3 | Di sec. butyl [2] | 2 | 136 | 30 | <50 |
| 4 | ---do [2] | 1 | 90 | 90 | <50 |
| 5 | Dicresyl [3] | 2 | 136 | 30 | <50 |
| 6 | ---do [3] | 1.5 | 90 | 90 | <50 |
| 7 | ---do [3] | 1 | 90 | 30 | <50 |
| 8 | ---do [3] | 1 | 40 | 360 | <50 |
| 9 | Monocresyl [4] | 1 | 136 | 30 | <50 |
| 10 | Tricrysl [4] | 1 | 136 | 30 | <50 |

[1] Based on weight of titanium tetrachloride.
[2] As sodium or potassium salt.
[3] As free acid.
[4] Mixture of ammonium salts and free acid.

In commercial practice the distilled titanium tetrachloride would normally be burned to titanium dioxide without condensation.

The results indicate that very satisfactory results are obtained when the weight of the dithiophosphate ester is about equal to the weight of the vanadium impurity. Run 8 indicates that the xanthate ester reacts slowly at room temperature with the vanadium impurities.

*Example 11*

The procedure of Example 8 was repeated except that the titanium tetrachloride was distilled at a pressure of about 75 mm. of mercury (60°–70° C.).

The condensed titanium tetrachloride contained less than 50 parts per million of $V_2O_5$ and was nearly water-white in color.

We claim:

1. A process for purifying crude liquid titanium tetrachloride having a volatile vanadium impurity dissolved therein which comprises heating said titanium tetrachloride with a dithiophosphate ester thereby rendering at least a part of the vanadium in said impurity insoluble and non-volatile.

2. A process according to claim 1 wherein the phosphate ester is dicresyl dithiophosphate.

3. A process according to claim 1 wherein the temperature at which the titanium tetrachloride is heated is between about 40° C. and 90° C.

4. A process for purifying crude liquid titanium tetrachloride having a volatile vanadium impurity dissolved therein, which comprises uniformly admixing a diester of dithiophosphoric acid with said titanium tetrachloride, heating the resulting mixture thereby rendering at least a part of said vanadium impurity insoluble and non-volatile, and then distilling the treated titanium tetrachloride to recover purified titanium tetrachloride therefrom, the temperature of said heating and said distillation being between about 40° C. and 90° C.

References Cited in the file of this patent

UNITED STATES PATENTS 2,289,327    Pechukas       July 7, 1942
2,289,328    Pechukas       July 7, 1942